United States Patent [19]

DuBois

[11] 4,167,929

[45] Sep. 18, 1979

[54] ENGINE INCLUDING SPEED-CONTROL STARTER INTERLOCK

[75] Inventor: Edmund H. DuBois, Zion, Ill.

[73] Assignee: Outboard Marine Corporation, Waukegan, Ill.

[21] Appl. No.: 831,146

[22] Filed: Sep. 7, 1977

[51] Int. Cl.² ........................ F02N 17/00; F02N 1/02; G05G 5/08; A01D 75/28

[52] U.S. Cl. ........................... 123/179 K; 123/185 A; 123/185 B; 74/534; 74/850; 74/873; 56/10.5

[58] Field of Search ........ 123/179 K, 185 BB, 185 B, 123/185 BA, 185 A; 74/534, 850, 477, 873; 56/10.5

[56] References Cited

U.S. PATENT DOCUMENTS

| | | | |
|---|---|---|---|
| 2,500,076 | 3/1950 | Honeyman | 123/185 BA |
| 2,723,655 | 11/1955 | Shimanckas | 74/534 |
| 2,906,251 | 9/1959 | Soder, Jr. | 123/99 |
| 3,906,921 | 9/1975 | Tillotson et al. | 123/179 K |
| 3,958,398 | 5/1976 | Fuelling, Jr. et al. | 56/10.5 |
| 3,971,353 | 7/1976 | Harkness et al. | 123/179 K |

*Primary Examiner*—Ronald H. Lazarus
*Assistant Examiner*—M. Moy
*Attorney, Agent, or Firm*—Michael, Best & Friedrich

[57] ABSTRACT

Disclosed herein is an engine including a timer plate which is operable to concurrently adjust the engine spark and the setting of the engine throttle valve, a rotatable starter mechanism, and a starter interlock for preventing engine starting when the timer plate is at a predetermined advanced speed setting. The starter interlock includes a resilient, unitary blocking element having a cam follower portion and a pawl portion which is movable between a normal nonoperating position and an operating position to prevent rotation of the engine starter mechanism and further includes a projection on the timer plate which is located to selectively engage the blocking element cam follower portion and move the pawl portion to the operating position when the timer plate is moved to the predetermined advanced speed setting.

13 Claims, 4 Drawing Figures

ENGINE INCLUDING SPEED-CONTROL STARTER INTERLOCK

BACKGROUND OF THE INVENTION

This invention relates to starter interlocks for engines and, more particularly, to starter interlocks for engines wherein speed control is provided by the coordinated operation of a timer plate and a throttle valve.

For various reasons, including a potential safety hazard to the operator, it is desirable to provide internal combustion engines, such as outboard motor engines and the like, with a starter interlock mechanism which is arranged to prevent engine starting when the speed control mechanism is at an advanced speed setting. In some engines, particularly two-cycle engines for outboard motors and the like, speed control is effected in part by the timing and in part by movement of the engine throttle valve. Speed control mechanisms including a connection between the timer plate and the throttle valve for concurrent operation of these two speed controlling devices are known. Examples of prior art speed control mechanisms of this type are disclosed in the Shimanckas U.S. Pat. No. 2,723,655, issued Nov. 15, 1955, and the Soder U.S. Pat. No. 2,906,251, issued Sept. 29, 1959, and the Williams U.S. Pat. No. 2,988,929, issued June 20, 1961. The first of these patents discloses a multi-component starter interlock mechanism including a detent which is operated in response to movement of the throttle valve connection and engages lugs on the starter pulley to prevent rotation of the starter pulley when the throttle valve is at an advanced speed setting. Attention also is directed to the Hamman U.S. Pat. No. 3,267,922, issued Aug. 23, 1966, the Tillotson et al U.S. Pat. No. 3,906,921, issued Sept. 23, 1975, and the Fuelling et al U.S. Pat. No. 3,958,398, issued May 25, 1976, for other examples of prior art constructions for engine starters and starter interlocks.

SUMMARY OF THE INVENTION

The invention provides an engine including a timer plate mounted for movement to adjust engine speed, means connected to the timer plate for moving the timer plate between settings corresponding to low and advanced engine speeds, a movable starter member operable to initiate engine starting, means for moving the starting member to start the engine, and unitary means for cooperating with the timer plate and with the starter member for preventing starting movement of the starter member when the timer plate is moved to a setting corresponding to a predetermined advanced engine speed.

In one embodiment, the last-mentioned means comprises a starter interlock including a unitary blocking element which is mounted for movement between a blocking position to prevent starting movement of the starting means and a normal unblocking position and an actuating means on the timer plate for selectively engaging the blocking element and moving the blocking element to the blocking position when the timer plate is moved to the predetermined advanced speed setting.

In one embodiment, the starting member is rotatable, the means for moving the starter member is a rotatable member connected thereto and having abutment means, and the blocking element is made from a resilient material and includes an integral pawl portion which is movable between an operating position wherein the pawl portion is engageable with the abutment means to prevent starting rotation of the rotatable member and a nonoperating position wherein the pawl portion is not engageable with the abutment means.

In one embodiment, the blocking element includes a first integral spring element for biasing the pawl portion toward the operating position and a second integral spring member incorporating a cam follower portion which is selectively engaged by the actuating means on the timer plate. The second spring member cooperates with the cam follower portion, when the actuating means on the timer plate engages the cam follower portion, to override the biasing force of the first spring member and move the pawl portion to the operating position and to permit rotation of the rotatable member in a direction opposite to starting rotation.

In one embodiment, the actuation means includes a radially outwardly extending projection on the timer plate located to engage the cam follower portion on the blocking element when the timer plate is moved to the predetermined advanced speed setting and to be disengaged from the cam follower portion when the timer plate is at a setting below the predetermined advanced speed setting.

One of the principal features of the invention is the provision of an engine including a simple and reliable speed-controlled starter interlock.

Another of the principal features of the invention is the provision of an engine including a timer plate which is movable to adjust the engine speed and a starter interlock which is arranged to operate in response to the movement of the timer plate and prevent engine starting when the timer plate is at a setting corresponding to a predetermined advanced engine speed.

A further of the principal features of the invention is the provision of such an engine wherein the starter interlock includes a unitary, resilient blocking element having an integral pawl section which is movable between an operating position to block starting movement of a movable starter member and a nonoperating position.

Other features and advantages of the invention will become apparent to those skilled in the art upon reviewing the following detailed description, the drawings, and the appended claims.

Figure 1:
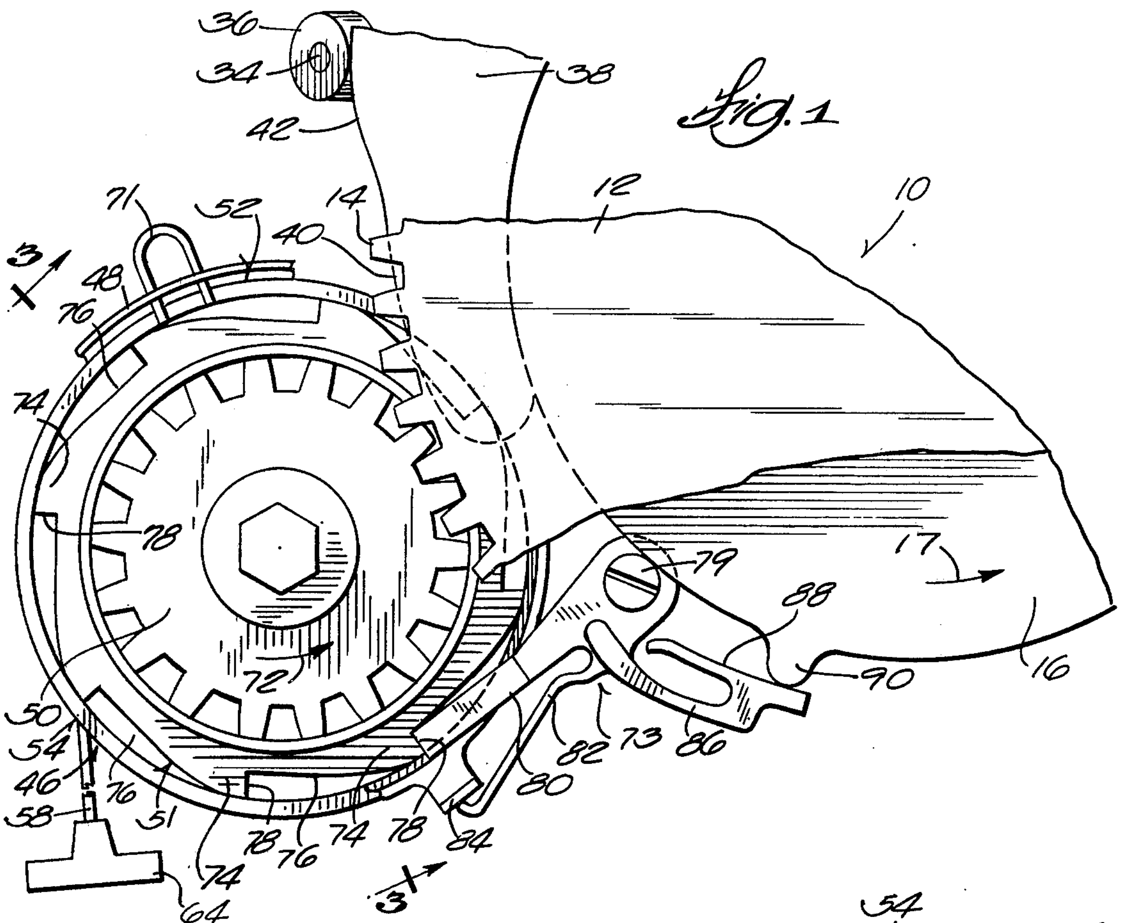
FIG. 1 is a top plan, fragmentary view, partially broken away, of an outboard motor engine incorporating a starter interlock embodying various of the features of the invention with various of the parts shown in their locations when the engine speed control is at an advanced speed setting.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purposes of description and should not be regarded as limiting.

GENERAL DESCRIPTION

Illustrated fragmentarily in FIG. 1 is an internal combustion engine 10 for an outboard motor incorporating a starter interlock embodying various of the features of the invention.

The engine 10 includes a rotatable flywheel 12 (shown fragmentarily) carrying an engine starter gear 14 and a timer plate 16 (shown fragmentarily) which is oscillatable in opposite rotational directions for adjusting the spark advance. The spark is advanced by rotating the timer plate 16 in the counterclockwise direction (i.e., in the direction of the arrow 17) as viewed in FIG. 1.

Figure 2:
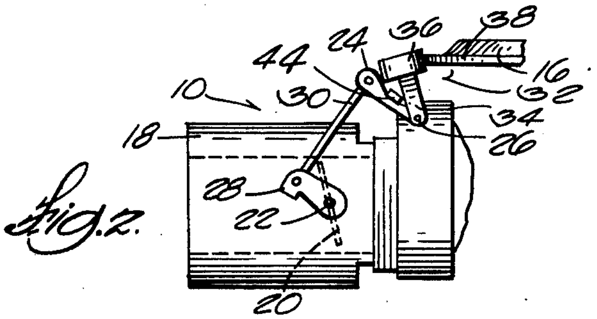
FIG. 2 is a fragmentary side view of the engine showing some of the parts omitted from FIG. 1 for clarity, which parts are illustrated in a somewhat reduced scale.

As illustrated diagrammatically in FIG. 2, the engine 10 also includes a carburetor 18 having a throttle valve 20 mounted on a shaft 22. Movement of the throttle valve 20 between low and high speed settings is effected through a linkage arrangement including a lever 24 which is rotatably mounted on a stud 26 and is connected to a rocker arm 28 fixedly mounted on the throttle valve shaft 22 by a link 30. The throttle valve 20 is shown at an intermediate speed setting in FIG. 2.

Pivotally mounted on the stud 26 is a cam follower 32 including an arm 34 and a cam follower roller 36. Located on the timer plate 16 for moving the throttle valve 12 in response to oscillatory movement of the timer plate 16 (see FIG. 1) is a cam 38 having a portion 40 which is nearly concentric with the rotational axis of the timer plate 16 and a portion 42 having an increasing radius in the spark and speed advancing direction of the timer plate 16. These cam portions successfully engage the cam follower roller 36 as the timer plate 16 is rotated to advance the spark and increase engine speed. As the cam portion 42 starts to engage the cam follower roller 36, the cam follower 32 is rotated in the counterclockwise direction as viewed in FIG. 2, causing the cam follower arm 34 to engage a lug 44 on the lever 24 and opening movement thereafter is transmitted to the throttle valve 20 via the link 30 and the rocker arm 28.

Various conventional means can be used for moving the timer plate 16 between settings corresponding to low and advanced engine speeds. For instance, a manual control handle (not shown) connected to the timer plate 16 and arranged in the manner disclosed in the above-identified Shimanckas U.S. Pat. No. 2,723,655 or a rocker arm (not shown) pivotally connected at one end to the timer plate 16 and operatively connected at the other end to a remotely located speed control (not shown) in the manner disclosed in the above-identified Soder U.S. Pat. No. 2,906,251 can be used for this purpose. Both of these patents are incorporated herein by reference.

Figure 3:
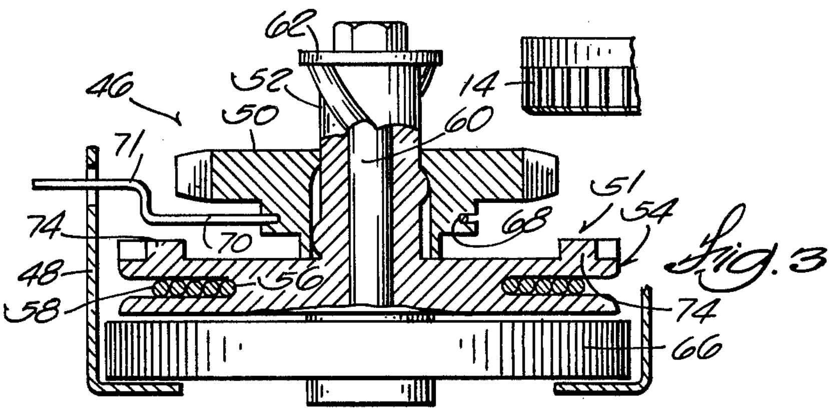
FIG. 3 is a sectional view taken generally along line 3—3 in FIG. 1.

Mounted on the engine 10 (FIGS. 1 and 3) is a starter mechanism 46 which is adapted to be actuated so as to engage the starter gear 14 and rotate the engine for starting. While various arrangements can be used, in the specific construction illustrated, the starting mechanism 46 includes a cylindrical frame or housing 48 fixed relative to the engine 10, a starter pinion 50 which is meshable with the starter gear 14, and means for rotating the starting pinion 50 and axially displacing it between a retracted position axially spaced from the starter gear 14 and an advanced position in driving engagement with the starter gear 14. This last-mentioned means includes a combined pulley and drive member or assembly 51 which is rotatable relative to the housing 48.

More particularly, the combined pulley and drive assembly 51 includes a drive worm 52 carrying the starter pinion 50. The assembly 51 also includes a circular pulley 54 defining a groove 56 which receives a pull rope 58. The combined pulley and drive assembly 51 is mounted on a shaft or pin 60 for rotation relative to the housing 48. Mounted on the outer end portion of the pin 60 is a retainer 62 for limiting the axial advance of the starter pinion 50 towards the starter gear 14. The pull rope 58 has a pull handle 64 on the outer free end and is normally wound up in the pulley groove 56 by a rewind or recoil spring (not shown) which is located in a spring housing 66 with one end anchored to the combined pulley and drive assembly 51 and the other end anchored to the inside of the spring housing 66.

Mounted in an annular groove 68 on the starter pinion 50 for common axial movement with the starter pinion is a drag spring 70 which frictionally restrains rotary movement of the starter pinion 50. The drag spring 70 includes an offset portion 71 which, after initial rotation of the starter pinion 50, engages the housing 48 to prevent further rotation of the drag spring 70 even though the starter pinion 50 continues to rotate.

In operation, when the pull rope 58 is pulled, the drive worm 52 rotates in the counterclockwise direction (i.e., in the direction of the arrow 72) as viewed in FIG. 1 to uncoil or unwind the recoil spring inside the spring housing 66. Upon release of the pull rope 58, the recoil spring rewinds and thereby rotates the drive worm 52 in a clockwise direction, simultaneously winding the pull rope 58 in the pulley groove 56. In response to clockwise rotation of the drive worm 52 during pulling of the pull rope 58, the drag spring 70 frictionally restrains rotation of the starter pinion 50, causing the starter pinion 50 to travel axially on the drive worm 52 from a retracted position to the advanced starter gear engagement position. Upon engaging the retainer 62, the pinion 50 meshes with the starting gear 14 and rotates with the drive worm 52, while rotating relative to the drag spring 70, to drive the engine starter gear 14.

As thus far described, the construction is generally conventional.

A starter interlock is provided for preventing starting movement of the combined pulley and drive assembly 51 when the timer plate 16 is moved to a setting corresponding to a predetermined advanced engine speed. In the specific construction illustrated, such means includes a unitary blocking element 73 which is movable between a blocking position to prevent starting movement of the combined pulley and drive assembly 51 and a normal unblocking position and actuating means on the timer plate 16 for selectively engaging the blocking element 73 and moving it to the blocking position when the timer plate 16 is moved to the predetermined advanced engine speed setting.

More specifically, a plurality of circumferentially spaced ratchet teeth 74 are provided on one of the exterior faces of the pulley 54. Each of the ratchet teeth 74 has an inclined surface 76 and a shoulder 78 adapted to serve as abutment means which cooperates with the blocking element 73 to prevent rotation of the combined pulley and drive assembly 51 when the blocking element 73 is in the blocking position.

The blocking element 73 is made from a resilient material, such as a synthetic plastic material, and is pivotally mounted on the engine at 79. The blocking element 73 includes a pawl portion 80 which is movable between an operating position shown in FIG. 1 wherein it extends into the path of the ratchet teeth 74 and is engageable with one of the ratchet teeth shoulders 78 to prevent rotation of the combined pulley and drive assembly 51 and a nonoperating position shown in FIG. 4 wherein it is radially displaced from the travel path of the ratchet teeth 74 and the combined pulley and drive assembly 51 can be rotated to start the engine. Formed as an integral part of the blocking element 73 for biasing the pawl portion 80 toward the nonoperating position is a first spring member 82 having an outer end portion which bears against a bracket 84 on the housing 48. Also formed as an integral part of the blocking element 73 is a second spring member 86 carrying a cam follower portion 88.

Figure 4:
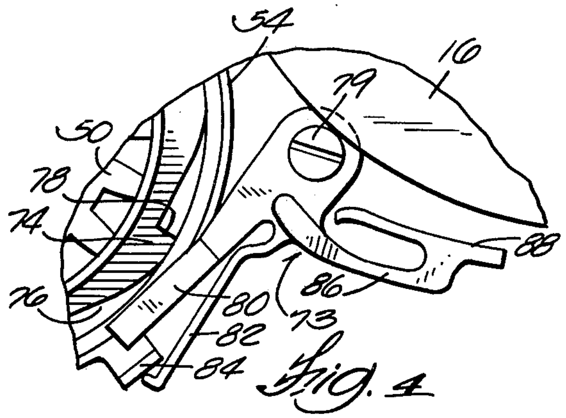
FIG. 4 is a fragmentary, plan view of some of the parts shown in FIG. 1, which parts are illustrated in their location when the engine speed control is at a low speed setting.

Provided on the timer plate 16 to serve as the actuating means is a radially outwardly extending projection 90 which is located to engage the cam follower portion 88 of the blocking element 73 when the timer plate is moved to the predetermined advanced engine speed setting as shown in FIG. 1 and to be disengaged from the cam follower portion 88 when the timer plate 16 is at a setting below the predetermined advanced engine speed setting as shown in FIG. 4.

In operation, when the timer plate 16 has been moved to the predetermined advanced engine speed setting shown in FIG. 1, the projection 90 engages the cam follower portion 88 of the blocking element 73 and imparts a sufficient force on the pawl portion 80, through the second spring member 86, to override the biasing force of the first spring member 82 and move the pawl portion 80 to the operating position. If engine starting is attempted in this condition, the pawl portion 80 engages a ratchet tooth shoulder 78 to prevent rotation of the combined pulley and drive assembly 51 and thereby prevents the engine from being started. When the timer plate 16 is at a setting below the predetermined advanced engine speed setting shown in FIG. 4, the projection 90 is not engaged with the cam follower portion 88 and the first spring member 82 holds the pawl portion 80 in the nonoperating position and the combined pulley and drive assembly 51 can be rotated in the normal manner to start the engine.

In the event the timer plate 16 is moved to the predetermined advanced engine speed setting while the pull rope 58 is still being pulled and the pawl portion 80 is in the operating position, the second spring member 86, upon subsequent release of the pull rope 58, permits the pawl portion 80 to be deflected or cammed radially outwardly by the inclined surfaces 76 of the ratchet teeth 74 so that the combined pulley and drive assembly 51 can be rewound by the recoil spring.

Various of the features of the invention are set forth in the following claims.

What is claimed is:

1. An engine comprising a rotatably mounted flywheel, a movably mounted timer plate, means connected to said timer plate for moving said timer plate between settings corresponding to low and advanced engine speeds, a starter mechanism adapted to engage said flywheel for rotation thereof to start the engine, said mechanism including a movable starter member, means for moving said starter member to start the engine, and a starter interlock including a unitary blocking element which is mounted for movement between a blocking position to prevent starting movement of said starting member and a normal unblocking position to permit starting movement of said starting member, and actuating means on said timer plate for selectively engaging said blocking element to move said blocking element to the blocking position when said timer plate is moved to a setting corresponding to a predetermined advanced engine speed.

2. An engine according to claim 1 wherein said starting member is rotatable, wherein said means for moving said starter member comprises a rotatable member connected to said starter member and having abutment means, and wherein said blocking element is made from a resilient material and includes an integral pawl portion which is movable between an operating position wherein said pawl portion is engageable with said abutment means to prevent starting rotation of said rotatable member when said blocking element is in the blocking position and a nonoperating position wherein said pawl portion is not engageable with said abutment means when said blocking element is in the unblocking position.

3. An engine according to claim 2 wherein said blocking element includes an integral cam follower portion which is engaged by said actuating means when said timer plate is moved to said predetermined advanced speed setting.

4. An engine according to claim 2 wherein said blocking element includes an integral spring member for biasing said pawl section toward the nonoperating position.

5. An engine according to claim 2 wherein said abutment means includes a plurality of circumferentially spaced ratchet teeth on said rotatable member.

6. An engine according to claim 2 wherein said engine includes a starter gear, wherein said starting member includes a starter pinion carried on a starter shaft for movement relative to said starter shaft, in response to rotation of said starter shaft in the starting direction, to an engaged position in mesh with said starter gear, wherein said rotatable member includes a circular member which is mounted on said starter shaft and has opposed exterior faces and a starter rope which is wound on said circular member and has a free end which is pulled to rotate said starter shaft in the starting direction, and wherein said abutment means comprises a plurality of circumferentially spaced ratchet teeth on one of said exterior faces of said circular member.

7. An engine according to claim 3 wherein said blocking element includes a first integral spring member for biasing said pawl portion toward the nonoperating position and a second integral spring member including said cam follower portion, said second spring member cooperating with said cam follower portion, when said actuating means engages said cam follower portion, to override the biasing force of said first spring member and move said pawl portion to the operating position and to permit rotation of said rotatable member in a direction opposite to starting rotation.

8. An engine according to claim 3 wherein said actuating means includes a radially outwardly extending projection on said timer plate located to engage said cam follower portion and move said pawl portion to the operating position when said timer plate is moved to said predetermined advanced engine speed setting and to be disengaged from said cam follower portion when said timer plate is at a setting below said predetermined advanced engine speed setting.

9. An engine comprising a movable timer plate, means connected to said timer plate for moving said timer between settings corresponding to low and advanced engine speeds, a starter gear, a starting mechanism including a rotatable starter member, a starter pinion carried on said starter member for movement relative to said starter member, in response to rotation of said starter member in the starting direction, to an engaged position in mesh with said starter gear, and means for rotating said starter member in the starting direction, and a starter interlock including an abutment means on said starter member, a unitary, resilient blocking element including an integral cam follower portion and an integral pawl portion mounted for movement between an operating position wherein said pawl portion is engageable with said abutment means to prevent starting rotation of said rotatable member and a non-operating position wherein said pawl portion is not engageable with said abutment means, and actuating means on said timer plate for selectively engaging said cam follower portion on said blocking element to move said pawl portion to the operating position when said timer plate is moved to a setting corresponding to a predetermined advanced engine speed.

10. An engine according to claim 9 wherein said blocking element includes a first integral spring member for biasing said pawl portion toward the operating position and a second integral spring member including said cam follower portion, said second integral spring member cooperating with said cam follower portion, when said actuating means engages said cam follower portion, to override the biasing force of said first spring member and move said pawl portion to the operating position and to permit rotation of said rotatable member in a direction opposite to starting rotation.

11. An engine according to claim 10 wherein said actuating means includes a radially outwardly extending projection on said timer plate located to engage said cam follower portion and move said pawl portion to the operating position when said timer plate is moved to said predetermined advanced engine speed setting and to be disengaged from said cam follower portion when said timer plate is at a setting below said predetermined advanced engine speed setting.

12. An engine according to claim 11 wherein said rotatable member includes a circular member which is mounted on said starter shaft and has opposed exterior faces and a starter rope which is wound on said circular member and has a free end which is pulled to rotate said starter shaft in the starting direction, and wherein said abutment means comprises a plurality of circumferentially spaced ratchet teeth on one of said exterior faces of said circular member.

13. An engine comprising a rotatably mounted flywheel, a movably mounted timer plate, means connected to said timer plate for moving said timer plate between settings corresponding to low and advanced engine speeds, a starter mechanism operable to engage said flywheel and to initiate engine starting, said mechanism including a rotatable starter member, means for rotating said starting member in one direction to start the engine, means cooperating with said timer plate and with said starter member for preventing rotation of said starter member in said one direction and for permitting rotation of said starter member in a direction opposite to said one direction when said timer plate is moved to a setting corresponding to a predetermined advanced engine speed.

* * * * *